United States Patent [19]

Berfield

[11] Patent Number: 4,838,838

[45] Date of Patent: Jun. 13, 1989

[54] BELT DRIVING PULLEY HAVING A ROUGHENED SURFACE TO REDUCE NOISE

[75] Inventor: Robert C. Berfield, Jersey Shore, Pa.

[73] Assignee: Shop-Vac Corporation, Williamsport, Pa.

[21] Appl. No.: 173,425

[22] Filed: Mar. 25, 1988

[51] Int. Cl.[4] ............................................... F16H 7/10
[52] U.S. Cl. .................................. 474/113; 15/49 C; 474/190
[58] Field of Search ............... 474/113, 114, 118, 166, 474/167, 190–194; 15/49 C, 41 R, 42, 49 R, 87

[56] References Cited

U.S. PATENT DOCUMENTS

| | | | |
|---|---|---|---|
| 2,184,545 | 12/1939 | Collier | 474/190 X |
| 3,284,830 | 11/1966 | Kroll | 15/49 C |
| 3,570,040 | 3/1971 | Wada | 15/49 C X |
| 4,366,593 | 1/1983 | Parikh | 15/49 C |
| 4,658,458 | 4/1987 | Berfield et al. | 15/49 C |

Primary Examiner—Thuy M. Bui
Attorney, Agent, or Firm—Ostrolenk, Faber, Gerb & Soffen

[57] ABSTRACT

Undesirable noise developing from relative sliding between a belt and a pulley when the traction between the belt and the pulley is loosened to halt the belt from being driven by the pulley is eliminated or alleviated by roughening the inner surface of the pulley to a consistency somewhat like that of sanded wood surface. Preferably, the inner surface is roughened in accordance with published Moldtech Standard 1055-5. The belt has a circular cross-section and is formed of polyurethane. Moreover, the roughened surface on the drive pulley improves the traction between the belt and the drive pulley when the belt is tightened in order to be driven by the drive pulley.

16 Claims, 4 Drawing Sheets

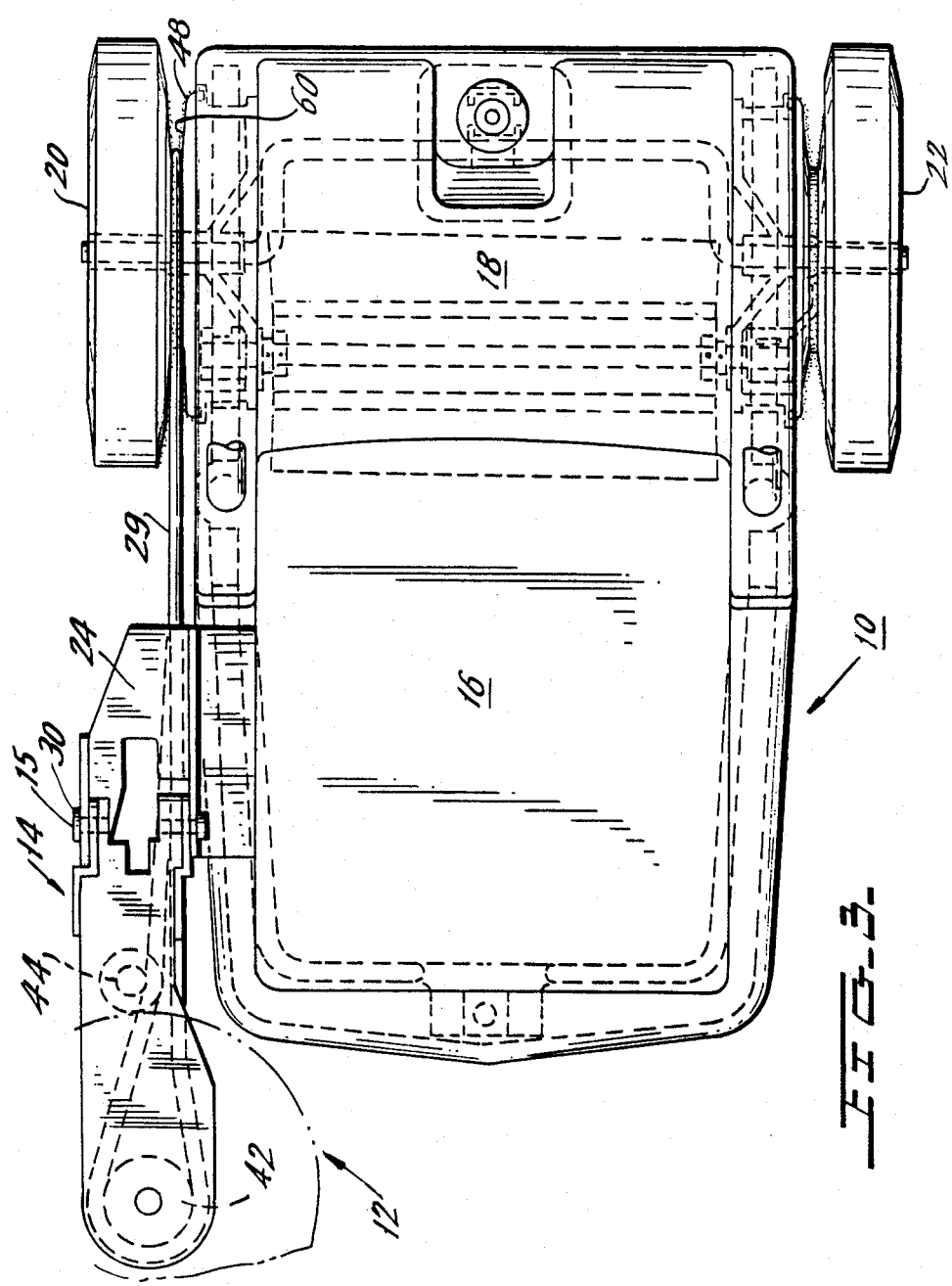

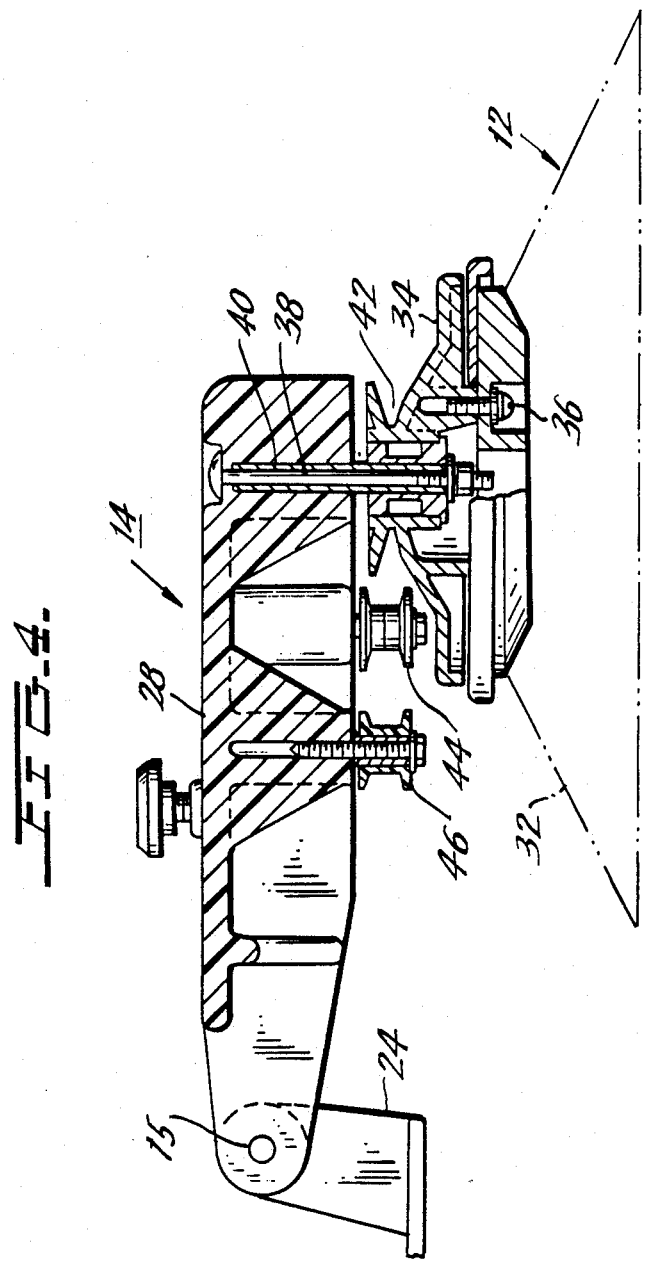

BELT DRIVING PULLEY HAVING A ROUGHENED SURFACE TO REDUCE NOISE

FIELD OF THE INVENTION

The present invention relates to a drive pulley selectively adapted to have a drive belt slide over it without noise or to be securely engaged by the drive belt. It has particular application as a drive pulley for rotary brush sweeper, and more particularly a rotary brush sweeper with a brush that is mechanically selectively engaged or disengaged from its drive.

BACKGROUND OF THE INVENTION

The present invention arose out of an undesirable noise condition experienced with the drive of the auxiliary brush of the rotary brush sweeper described in U.S. Pat. No. 4,658,458 (the '458 patent), incorporated by reference herein. The sweeper of the '458 patent has a main rotary brush which rotates about a horizontally disposed axis and a rotatable auxiliary side brush which rotates about a generally vertical axis and is disposed to one side of the main rotary brush.

As an operator moves the sweeper about, on a floor or the like, the wheels of the sweeper rotate and this rotation is imparted to the auxiliary side brush. The auxiliary side brush is driven from one of the wheels of the sweeper which drives a drive pulley on the wheel to rotate a driven pulley on the auxiliary side brush. A friction belt joins the drive pulley to the driven pulley on the auxiliary side brush. The belt is conventional and typically fabricated of polyurethane, having a smooth, somewhat tacky, outer surface. The drive pulley is typically smooth surfaced and molded.

The auxiliary side brush is mounted on a pivotable support that holds the auxiliary brush in operative contact with the surface being swept and that permits the side brush to be selectively pivoted to an upraised position. In the upraised position, the actual distance between the drive pulley and the driven pulley of the brush is reduced. As a result, the drive belt of the auxiliary side brush is disengaged from the drive pulley which avoids undesirable rotation of an upraised auxiliary side brush.

A physical embodiment of a rotary brush sweeper that had been constructed in accordance with the teaching of the '458 patent was discovered to generate a persistent noise, squeal or screech when the auxiliary side brush is upraised and the now non-moving belt slides over the drive pulley which is still being rotated by the driven wheel.

SUMMARY OF THE INVENTION

Accordingly, it is the primary object of the invention to eliminate an undesired noise generated by a belt sliding over its drive pulley.

Another object of the invention to provide an auxiliary side brush for a rotary sweeper which does not produce squealing or screeching when the auxiliary rotary brush is moved to its upraised position.

Another object of the invention is to provide a rotary brush sweeper with a driving mechanism for rotating one or more brushes which is free of squealing, screeching or other unacceptable noises during a mode when the drive mechanism is disengaged from the brushes.

These and other objects of the invention are attained using a novel drive pulley.

The drive pulley is preferably fabricated of molded plastic To solve the above noise problem, the surface of the pulley on which the belt slides the belt is not smooth, but instead is roughened to a consistency somewhat like that of a sanded wood surface. Preferably, the belt contacting surface is roughened according to the published Moldtech Standard 1055-5. Roughening of the surface of the drive pulley not only stops the noise at the belt, it also improves the traction and driving ability that is obtained when the belt is tightened over the drive pulley.

The pulley has particular application in a rotary brush sweeper having one or more rotatable brushes, one or more drive pulleys, and a respective belt for coupling each rotatable brush to its drive pulley. The sweeper includes means for releasing the traction between the belt and its drive pulley when a brush is moved into a disengaged position.

Other features and advantages of the present invention will become apparent from the following description of the invention which refers to the accompanying drawings.

BRIEF DESCRIPTION OF THE DRAWINGS

FIG. 3 is a simplified top plan view of the rotary brush sweeper of, the present invention illustrating the relative location of the various parts of the sweeper and the surface of the driving pulley.

FIG. 4 is a side cross-section through the auxiliary side brush and its mounting.

DETAILED DESCRIPTION OF A PREFERRED EMBODIMENT

Figure 1:
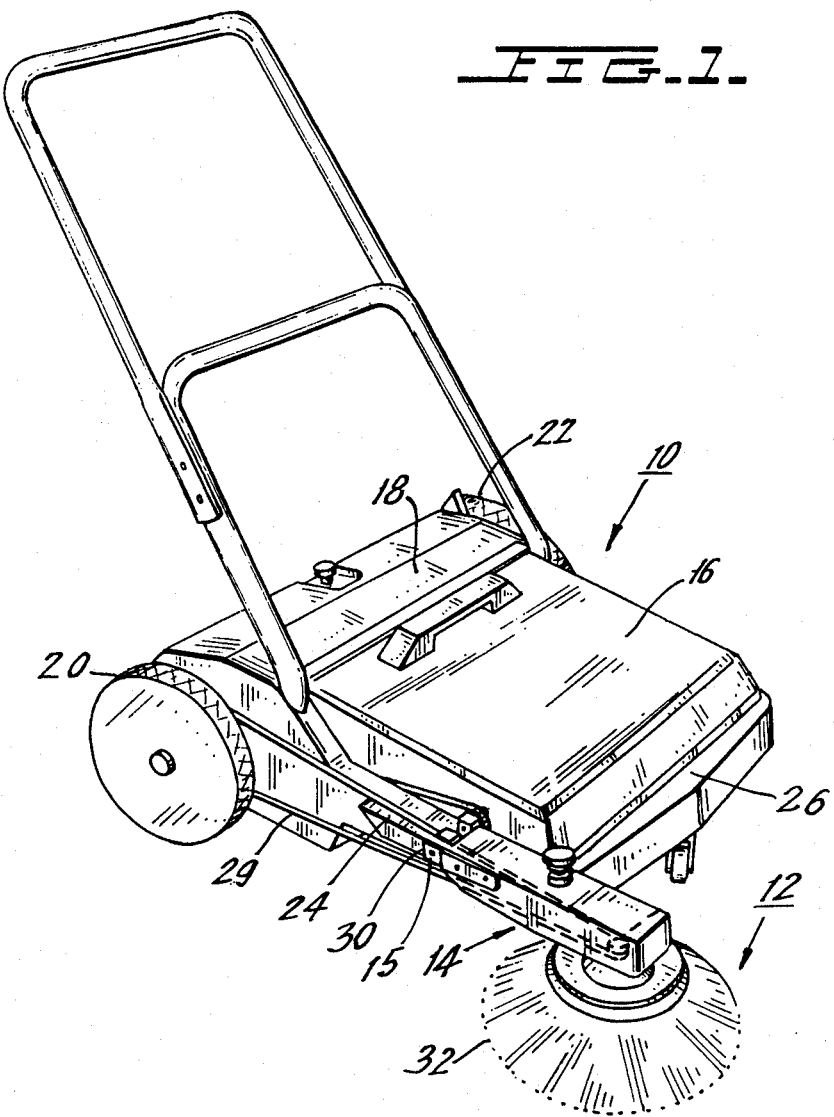
FIG. 1 is a perspective view of a rotary brush sweeper an auxiliary side brush.
Figure 2:
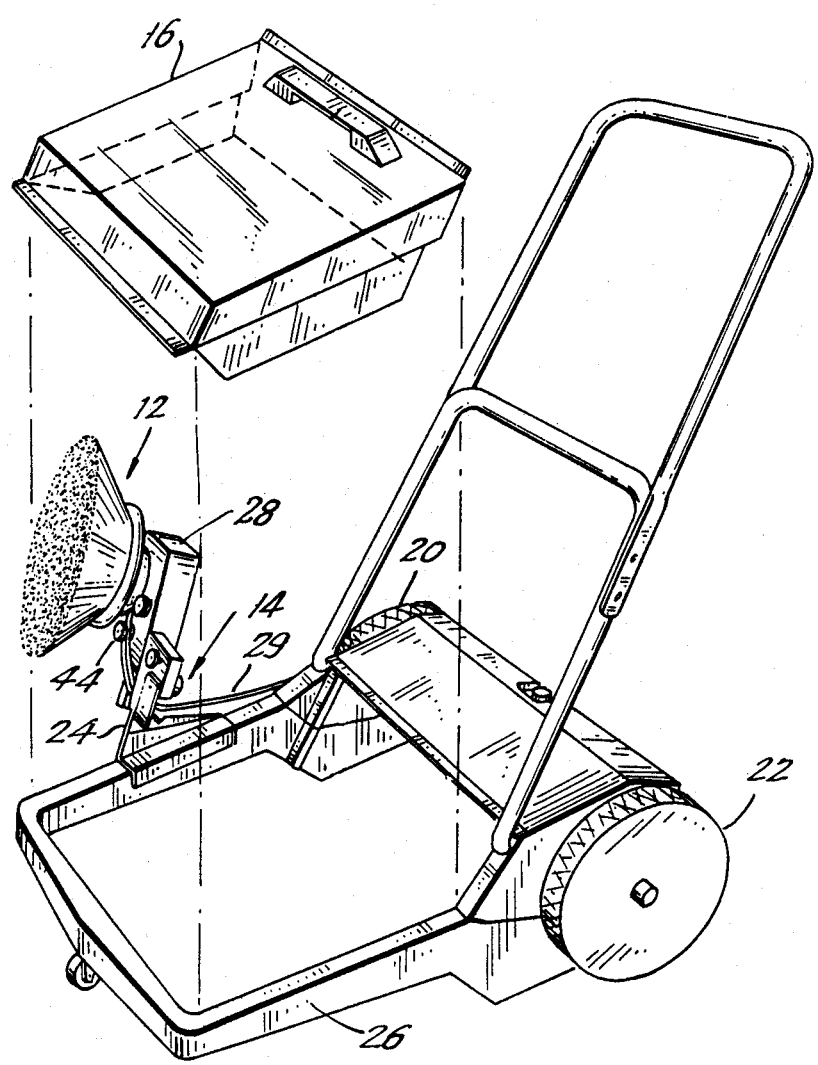
FIG. 2 is a perspective view of the sweeper with its auxiliary in an upraised position.

The sweeper 10 of FIG. 1 corresponds to the sweeper of the '458 patent. It includes a distinctive auxiliary side brush 12 which is mounted on a pivotable support 14 that pivots up and down around a pivot axis. The brush 12 and its support 14 are disposed to one side of a main sweeper housing 16. Sweeper 10 has a main rotary brush (not shown) which is located in main sweeper housing 16 under a cover 18, the main brush rotating about a horizontal axis extending parallel to the axis of wheels 20 and 22.

Referring to FIGS. 2-5, pivotable support 14 enables auxiliary side brush 12 to be freely pivoted to an upraised inoperative position (FIG. 2), away from the surface to be cleaned.

Pivotable support 14 of side brush 12 is secured on a lower frame 26 of sweeper 10 by means of a stationary bracket 24 and includes a pivoting brush support 28 pivotably attached to bracket 24, for example, at pivot axis 15 by a bolt/nut arrangement 30. The bristle portion 32 of the auxiliary side brush 12 is secured to rotatable hub 34 via bolts 36 and hub 34 is rotatable about a shaft 38 that spins within sleeve 40 of pivoting brush support 28.

In its lowered position, auxiliary side brush 12 is rotated through the cooperation of brush pulley 42 located on hub 34 of side brush 12, guiding pulleys 44 and 46, depending downwardly from pivoting brush support 28, a driving wheel pulley 48 (FIG. 3) which is secured to and rotates with rear wheel 20 of the sweeper, and belt 29 which couples driving pulley 48 to brush pulley 42. Pulleys 42, 44, 46 and 48 and belt 29 are arranged such that forward rotation of rear wheel 20 causes counterclockwise rotation of brush 12, as viewed from above.

Belt 29 is a conventional friction drive belt, formed of polyurethane, has a circular cross-section, and measures 5/16 inches in diameter. The surface of belt 29 is smooth but somewhat tacky.

The pivoting of side brush 12 to its upraised position (FIG. 2) brings driven brush pulley 42 nearer to driving pulley 48 and slightly shortens the path of belt 29 between those pulleys. This releases the traction between belt 29 and the still rotatable driving pulley 48 which halts rotation of side brush 12 although the driving pulley still rotates with the drive wheel 20. The belt 29 simply slides over the belt engaging driving surface 60 of the pulley 48.

The previously mentioned noise problem at driving pulley 48 was determined to result from relative sliding between pulley 48 and belt 29. The problem is solved, in accordance with the present invention, by roughening the generally V groove shaped surface 60 of wheel pulley 48 to a consistency somewhat like that of a sanded wood surface. Roughening of inner surface 60 of pulley 48 also improves the traction between belt 29 and driving pulley 48 in the lowered position of auxiliary side brush 12 and enhances the overall operability of sweeper 10.

Preferably, surface 60 is roughened according to published Moldtech Standard 1055-5. More specifically, wheel pulley 48 is molded from plastic, such as polypropylene, and its belt contacting surface 60 is roughened in the mold. The mold surface that forms the groove surface 60 is itself roughened through conventional techniques, for example, by acid etching of that surface in the mold.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A noise-reducing drive pulley, comprising:
   a rotatable device;
   pulley means for rotating the device, the pulley means having a belt-contacting surface;
   belt means coupled to and normally frictionally engaged with the belt-contacting surface on the pulley means; and
   belt loosening means for selectively loosening the frictional engagement of the belt means with the pulley means in a manner that enables relative sliding therebetween, the belt-contacting surface of the pulley means being roughened and effective for reducing noise generated from relative sliding between the belt means and the pulley means.

2. A noise-reducing drive pulley arrangement, comprising:
   a rotatable device and a driven pulley coupled to and effective for rotating the rotatable device;
   driving means including a driving pulley having a roughened belt-contacting surface;
   belt means for drivingly coupling the driving pulley to the driven pulley through frictional engagement of the belt means with the belt-contacting surface; and
   belt loosening means for selectively loosening the frictional engagement of the belt means with the belt-contacting surface in a manner that enables relative sliding between the belt means and the driving pulley.

3. The drive pulley arrangement of claim 2, wherein the belt means is disposed to travel over a path extending between the driving pulley and the driven pulley, the belt loosening means being effective for shortening the path.

4. The drive pulley arrangement of claim 2, wherein the roughened belt-contacting surface of the driving pulley has a consistency of a sanded wood surface.

5. The drive pulley arrangement of claim 4, wherein the belt-contacting surface of the driving pulley is roughened in accordance with published Moldtech Standard 1055-5.

6. The drive pulley arrangement of claim 4, wherein the belt means is fabricated of polyurethane.

7. The drive pulley arrangement of claim 6, wherein the driving pulley is fabricated of polypropylene.

8. The drive pulley arrangement of claim 2, wherein the driving pulley is fabricated of molded plastic.

9. The drive pulley arrangement of claim 8, wherein the belt-contacting surface of the driving pulley has a V groove shaped cross-section.

10. A rotary brush sweeper, comprising:
    a rotatable brush and brush pulley means coupled to and effective for rotating the rotatable brush;
    brush driving means for rotating the brush, the brush driving means including a driving pulley having a roughened belt-contacting surface;
    belt means for drivingly coupling the driving pulley to the brush pulley means through frictional engagement of belt means with the belt-contacting surface; and
    belt loosening means for selectively loosening the frictional engagement of the belt means with the belt-contacting surface in a manner that produces relative sliding between the belt means and the driving pulley.

11. The rotary brush sweeper of claim 10, further including a frame, the belt loosening means including a pivotable support mounted to the frame for pivotably supporting the rotatable brush on the frame.

12. The rotary brush sweeper of claim 11, the pivotable support being effective for selectively positioning the rotatable brush at a lowered position or at an upraised position.

13. The rotary brush sweeper of claim 12, further comprising guiding pulleys disposed between the driving pulley and the brush pulley means for guiding the belt means.

14. The rotary brush sweeper of claim 11, wherein the roughened belt-contacting surface of the driving pulley has a consistency of a sanded wood surface.

15. The rotary brush sweeper of claim 14, wherein the belt-contacting surface of the driving pulley is roughened in accordance with published Moldtech Standard 1055-5.

16. The rotary brush sweeper of claim 14, wherein the belt-contacting surface of the driving pulley has a V groove shaped cross-section.

* * * * *